United States Patent [19]

Russell

[11] Patent Number: 4,841,492

[45] Date of Patent: Jun. 20, 1989

[54] APODIZATION OF ULTRASOUND TRANSMISSION

[75] Inventor: Robert H. Russell, Manhattan Beach, Calif.

[73] Assignee: North American Philips Corporation, New York, N.Y.

[21] Appl. No.: 82,248

[22] Filed: Aug. 5, 1987

[51] Int. Cl.$^4$ ............................................... G01S 9/68
[52] U.S. Cl. ..................................... 367/105; 367/905; 310/334; 73/626; 128/660.06
[58] Field of Search ................. 367/105, 103, 138, 12, 367/905; 73/625, 626, 642; 128/660.06; 310/334, 357

[56] References Cited

U.S. PATENT DOCUMENTS

| | | | |
|---|---|---|---|
| 3,890,618 | 6/1975 | Speisei | 367/103 X |
| 4,084,582 | 4/1978 | Nigam | 367/150 X |
| 4,117,446 | 9/1978 | Alais | 367/7 |
| 4,180,790 | 12/1979 | Thomas | 367/7 |
| 4,455,630 | 6/1984 | Loonen | 367/103 |
| 4,470,305 | 9/1984 | O'Donnell | 367/153 X |
| 4,518,889 | 5/1985 | 't Hoen | 367/103 X |
| 4,691,570 | 9/1987 | Hassler | 367/103 X |

OTHER PUBLICATIONS

Peterson et al., "Quantitative Evaluation of Real-Time Synthetic Aperture Acoustic Images", *A Review of Progress in Quantitative Non Destructive Evaluation*, (Plenum Press, New York), vol. 1, 1982, pp. 767-776.

't Hoen, "Aperture Apodization to Reduce the Off-Axis Intesity of the Pulsed-Mode Directivity Function of Linear Arrays", Ultrasonics, Sep. 1982, pp. 231-236.

Stephanishen, "*Transient Radiation from Pistons in an Infinite Planar Baffle*", J. Acoust. Soc. Am., 49, (1971), pp. 1629-1638.

Martin and Breazeale, "A Simple Way to Eliminate Diffraction Lobes Emitted by Ultrasonic Transducers", *J. Acoust. Soc. Am.*, 49, No. 5, (1971), pp. 1668, 1669.

Obberhettinger, "On Transient Solutions of the Baffled Piston Problem", J. of Res. Nat. Bur. Standards-B 65-B, (1961), pp. 1-6.

*Primary Examiner*—Thomas H. Tarcza
*Assistant Examiner*—John B. Sotomayor
*Attorney, Agent, or Firm*—Jack E. Haken

[57] ABSTRACT

An apodization attenuation circuit to achieve a selected percent Gaussian apodization of a focused ultrasound wavefront when transmitted from a linear or phased array. The circuit uses a string of resistors, one resistor positioned between the drivers of each element in the transducer array. Each node of the resistor string functions as the reference potential input for one driver. Each node includes a pair of normally open switches, one of which may be closed to common and one of which may be closed to full reference potential. By closing four switches, two to common and two to full reference potential, a profile of potential of a selected percent Gaussian apodization can be achieved such that the output pulse magnitude of each transducer element in an aperture varies as a Gaussian function of its distance from the center of the aperture.

9 Claims, 5 Drawing Sheets

APODIZATION OF ULTRASOUND TRANSMISSION

CROSS-REFERENCE TO RELATED APPLICATION

This invention is related to a patent application entitled "A Transmit Focus Generator for Ultrasound Imaging", R. H. Russell and L. D. Acker, inventors, filed Aug. 5, 1987 as Ser. No. 082,247, and incorporated herein by reference.

BACKGROUND OF THE INVENTION

1. Field of the Invention

The invention pertains to medical ultrasound imaging systems which utilize an array of transducer elements to transmit ultrasound energy. In particular, it pertains to an apodization function during transmission of a focused beam of coherent ultrasound energy from an array of transducer elements to control the amplitude of the pulses transmitted from each transducer element. Reduced sidelobe levels and improved directivity are achieved through apodization at the transmit stage.

2. Description of the Prior Art

A typical ultrasound imaging system used for medical imaging includes at least one ultrasound transducer, usually in the form of an array of transducer elements. The transducer is usually connected to transmitter stage circuitry, receiver stage circuitry and whatever devices may be necessary to effect mechanical scanning of the transducer. The transmitter stage comprises a generator of electrical excitation signals which are sent to the transducer. The transducer converts these signals into periodic pulse trains of ultrasound mechanical energy.

Transducer arrays used in medical imaging systems come in many forms, such as linear arrays, phased arrays, annular arrays and collimated image arrays. A transducer array usually consists of a plurality of transducer elements disposed on a surface in some designed arrangement such as a row, matrix or other geometric pattern. The individual elements or groups of elements are actuated or pulsed in sequence to transmit a beam of ultrasound energy at a target. Ultrasound echoes are returned from the target and may be received on the same transducer elements. The pulse echo data received is then interpreted and displayed to produce an image.

In the technology of medical imaging with ultrasound, the principles of the linear array and the phased array are well known, though the technical terminology can be semantically misleading. For the purposes of this application, the following definitions will be used. A linear array is an electronically scanned array of similarly sized and shaped elements arranged in an extended line, side by side. A group of contiguous transducer elements are electronically selected from the extended array, are pulsed for transmission and then sometimes used for reception of resultant echoes. The selected group of transducer elements is then commutated one or more positions along the array and the process repeated to scan successive parallel regions in the body. A linear array projects beams of ultrasound energy perpendicular to the face of the transducer element. The image format is usually rectangular.

A phased array refers to a short linear array of transducer elements, the transmitted energy being deflected from the normal perpendicular beam by inserting delays in the pulse signal to each element. Similarly the received pulse echo is steered in angle by inserting delays in the signal path from each angle before summation. The resulting image is pie-shaped and accomplishes the so-called sector scan.

Electronic focusing of both types of arrays is possible by a different set of time delays. By introducing time delays, focusing or phasing is possible to improve lateral resolution over a particular depth range inside a target. Focusing improves lateral resolution (beam width) in the focal zone and it improves sensitivity because of higher energies produced in the focal area.

Most modern pulse echo ultrasound imaging systems utilize a linear transducer array and employ dynamic electronic focusing during signal reception. Most linear array transducer systems also employ a fixed focus during pulse transmission, using a fixed mechanical lens. The axial resolution of such an array depends on the length of the pulse. Resolution in the transverse plane depends on the elevational dimension of the array.

The prior art has made some attempts to introduce horizontal (longitudinal) focusing at the transmitter stage of an ultrasound imaging system. In the transmit mode time delays have been used to steer beams by constructive and destructive interference of all pulsed signals. Whether in the transmit mode or the receive mode, these prior art time delays are frequently implemented in analog circuits, which trigger an oscillator, or by the analog delay of an existing pulse train. However, the use of analog delays introduces jitter in transmission, cross-talk and other forms of time noise.

Related to the problem of focusing, the issue of sidelobe suppression has also been the subject of much attention in the prior art. For medical imaging applications where human tissue acts as a diffusely reflecting structure, it is important to be able to differentiate subtle tissue structures in the presence of strong reflectors. This ability is limited by the sidelobes of the point spread function. It is, therefore, of great interest to develop systems with small sidelobe levels.

The conventional technique for reducing the sidelobe levels of a transducer array is "Aperture Apodization". Aperture weighting functions, such as Gaussian or Hanning functions, are applied to signals on the array elements. Such techniques are described, for example, in Peterson et al "Quantitative Evaluation of Real-Time Synthetic Aperture Acoustic Images", in: A Review of Progress in Quantitative Nondestructive Evaluation (Plenum Press, New York, Vol. 1, 1982, pages 767–776) and in 't Hoen "Aperture Apodization to Reduce the Off-axis Intensity of the Pulsed-mode Directivity Function of Linear Arrays", Ultrasonics, September 1982, pages 231–236, which are incorporated herein, by reference, as background material. Using these prior art techniques, the sidelobe level can be reduced at the expense of some increase in main lobe width. This trade-off is a fundamental one which is also encountered in spectral analysis and antenna design. When energy under the sidelobes is reduced, more energy is introduced under the main lobe.

The peak pressure in the emitted ultrasound beam is related to the grey-level distribution in the resultant image. The cross-section of the ultrasound beam emitted by a transducer is described by the emission directivity function which at any distance from the transducer, is defined as the variation of peak pressure as a function of lateral distance to the beam axis. The directivity function of a transducer is used to characterize its spatial resolution as well as its sensitivity to artifacts.

The directivity function of a transducer is related to its aperture function (which is the geometric distribution of energy across the aperture of the transducer). The prior art has recognized that, in narrowband systems, the far-field directivity function corresponds to the Fourier transform of the aperture function; this relationship has been applied for beam-shaping in radar and sonar systems. This relationship does not hold true, however, in medical ultrasound systems which utilize a short pulse, and thus a broad frequency spectrum, and which usually operate in the near-field of the transducer. Therefore, in medical ultrasound applications the directivity function of a transducer must be rigorously calculated or measured for each combination of transducer geometry and aperture function. The directivity function of a transducer may, for example, be calculated on a digital computer using the approach set forth in Oberhettinger On Transient Solutions of the "Baffled Piston Problem", *J. of REs. Nat. Bur. Standards-B* 65B (1961) 1–6 and in Stepanishen "Transient Radiation from Pistons in an Infinite Planar Baffle", *J. Acoust. Soc. Am.* 49 (1971) 1629–1638. One applies a convolution of the velocity impulse response to the transducer with the electrical excitation and with the emission impulse response of the transducer.

A transducer may be apodized by shaping the distribution of energy applied across the transducer to a desired aperture function. For a single disc, piezoelectric transducer, this has been accomplished by shaping the applied electric field through use of different electrode geometries on opposite sides of the disc as described, for example, in Martin and Breazeale "A Simple Way to Eliminate Diffraction Lobes Emitted by Ultrasonic Transducers", *J. Acoust. Soc. Am.* 49 No. 5 (1971) 1668, 1669 or by applying different levels of electrical excitation to adjacent transducer elements in an array. However the method of Martin and Breazeale is limited to a number of simple aperture functions and the use of separate surface electrodes requires complex transducer geometries and/or switching circuits.

SUMMARY OF THE INVENTION

The object of the present invention is to achieve a selected percent Gaussian apodization of a focused ultrasound wavefront when transmitted from a linear or phased array. The apodization is achieved even when the aperture size is changed from a small number of transducer elements to a large number of elements. To achieve this object, a transducer array for ultrasound pulse echo imaging is apodized by causing the transmit output pulse magnitude to vary as a function of its position in the transducer aperture, thereby improving its directivity. In the preferred embodiment the output pulse magnitude varies as a Gaussian function of distance from the center or centerline of the transducer aperture so that the magnitude at the edges of the aperture is a selected percentage of the magnitude at the center or centerline.

A secondary object of the invention is to combine the apodization of the transmit output pulse magnitude with a precise digital means to focus electronically the transmitted pulses, utilizing a transmit focus generator circuit for an array of transducers in an ultrasound pulse echo imaging system, enabling a group of transducer elements in said array, when subgroups are pulsed sequentially, to transmit a focused beam of coherent ultrasound energy and to achieve a selected percent Gaussian apodization of the focused ultrasound wavefront when transmitted from a linear or phased array.

The invention will be described and illustrated in terms of an embodiment used with a linear transducer array.

In accordance with the invention, aperture sidelobes in scanning imaging systems can be reduced if the imaging signals are transmitted from a focused linear aperture and received in a focused linear aperture. In apodization the excitation of the transducer elements is reduced as a function of distance from the acoustic axis. The recent prior art indicates that a 30% Gaussian apodization has a substantially better combination of spatial resolution and off-axis directivity characteristics than previously published aperture functions for medical ultrasound imaging.

This invention depends upon the fact that a Gaussian apodization viewed in a cross-section of the ultrasound beam can be closely approximated by a horizontal straight line near the apex and two equal sloping lines passing approximately through selected end points, as shown in FIG. 1. The invention is a shaped attenuation circuit, hereinafter called an apodization attenuation circuit, which generates such a profile of potential to serve as the reference input to the individual drivers of a linear array. The profile of potential shown in FIG. 1 is a 30% Gaussian apodization. Other Gaussian choices and power levels may be utilized. The output pulse magnitude approximates the desired 30% Gaussian apodization in the same way as the straight lines shown in FIG. 1. In addition, the developed approximation may be modified to match different sized apertures of ultrasonic elements.

The circuit of the invention uses a resistor string having one resistor for each transducer element in the linear array. These resistors are positioned between the transducer element drivers and are all connected in series. The circuit assigns one node of the resistor string to each transducer element driver and each node functions as the reference potential ($V_R$) input for that particular transducer element driver. In addition, the last resistor in the string is connected in turn to the first resistor in the string, thus forming a closed loop. Two normally open switches are connected between each node of the resistor string and the driver. Thus, for a linear array of N transducer elements, there are N resistors and 2N switches. To achieve the profile of potential shown in FIG. 3, that is, a 30% Gaussian apodization, the aperture function must have maximum potential applied to transducer element drivers near the center line of the aperture, corresponding to the horizontal straight line which intercepts the y-axis at the apex of the main lobe, and 30% potential applied to transducer element drivers at the two ends of the aperture, corresponding to the points on the x axis at which the sloping lines intercept the 30% line on the y-axis. To apply full reference potential to the center of the aperture, two of the 2N switches, one on each side of the center line corresponding to the two ends of the horizontal line at the apex are closed to the reference voltage. Two of the 2N switches beyond the aperture are closed to the common such that with increasing potential to each element driver toward the center of the aperture, the element drivers at each end of the aperture receive 30% of the reference voltage, following the profile of FIG. 3. Thus, along the entire loop of the resistor string two switches will be closed to the reference voltage and two switches will be closed to the common. By closing of the appropriate four switches, the profile of potential shown will be established. To determine which four of the 2N switches must be closed, the directivity function of the transducer must be rigorously calculated or measured for each combination of a transducer geometry and aperture function.

In a further embodiment, the invention may be combined with a system which provides precise digital control of phase and burst delays to control focusing in the transmit stage of a pulse echo imaging system, as disclosed in the cross-referenced application. The invention utilizes the system memory and a transmit focus generator circuit to store the precalculated states needed to generate this profile of potential and to modify the profile for different sized apertures. In particular, these parameters choose which switches are to be closed for a particular line scan to control the potential applied to each transducer driver through the endless loop of resistors. This profile of voltage is used to control the amplitude of pulses transmitted from each element, thus achieving a particular desired profile across a transmitted aperture. The system provides for each transducer element of a transducer array, and for the array itself, precise digital control over the transmission of a focused wavefront of ultrasound pulses, and a precise profile of potential which serves as the reference input to the individual drivers of a linear array.

DESCRIPTION OF THE PREFERRED EMBODIMENT

The invention relates to ultrasound transducer arrays wherein improved directivity and sidelobe suppression is achieved through apodization at the transmit stage. A transducer array for pulse echo ultrasound imaging is apodized by causing the transmit output pulse magnitude to vary as a function of its position in the transducer aperture. In the preferred embodiment the output pulse magnitude varies as a Gaussian function of distance from the center or centerline of the transducer aperture so that the magnitude of the potential at the edge of the aperture approximates a selected percentage of the magnitude at the center or centerline.

The present invention may be used with a circuit for transmitting a focused beam of coherent ultrasound, utilizing an array of ultrasound transducers, accomplishing precisely timed delays and capable of coherent pulse trains over a wide range of burst lengths.

The invention will be described in the context of a system for ultrasound medical imaging, and specifically in terms of digitally controlling a linear array of transducer elements to transmit an apodized and focused wavefront of ultrasound energy, using the transmit focus generator disclosed in the cross-referenced application.

Figure 2:
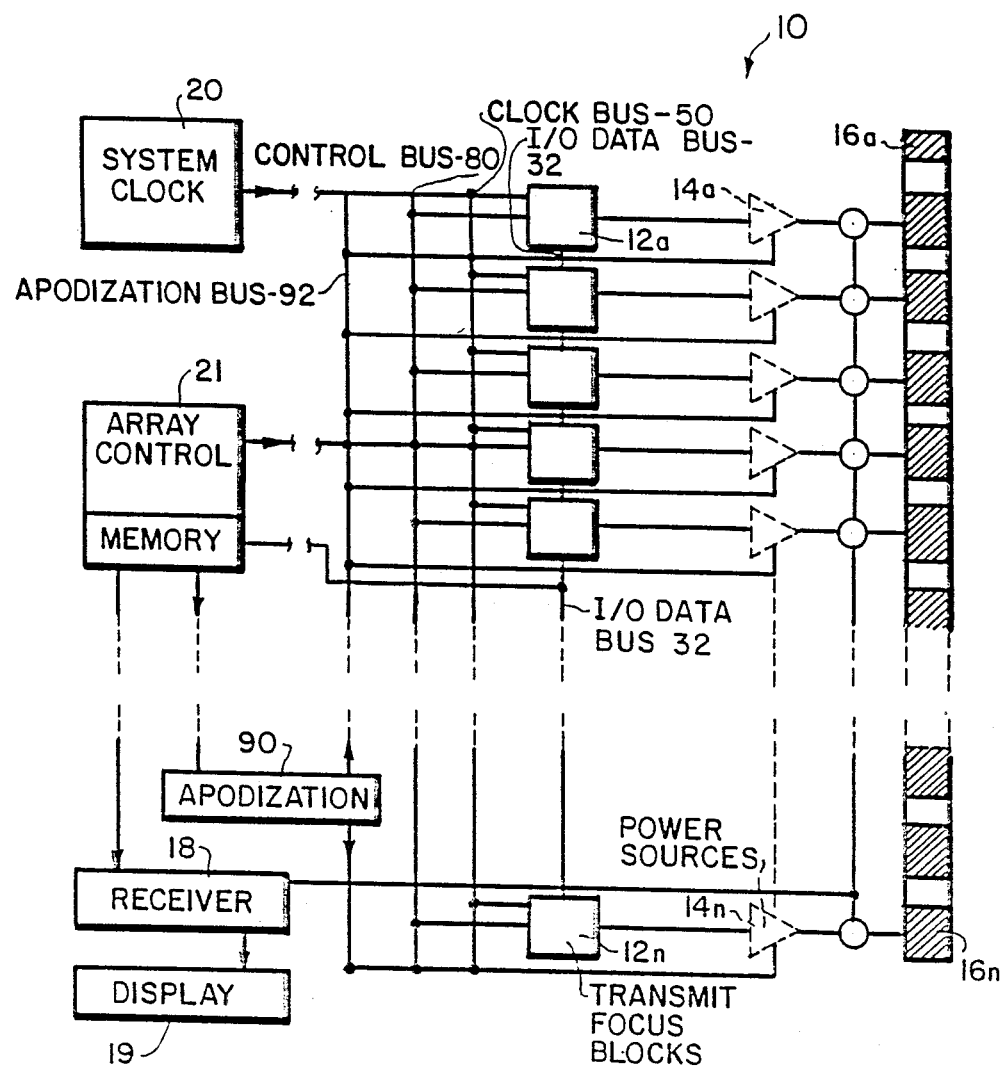
FIG. 2 is a simplified partial block diagram of the "front end" of a pulse echo ultrasound imaging system showing the interconnection of the subsystems relevant to the present invention.

Turning now to the drawings, FIG. 2 is a simplified block drawing of the "front end" 10 of an ultrasound medical imaging system which incorporates the present invention. In the system of the present invention, a linear transducer array 16, having N transducer elements 16a, . . . , 16n, is connected to both a transmit stage of the system having N power sources 14a, . . . , 14n and N transmit focus blocks 12a, . . . , 12n and a receive stage 18 having a display system 19. In this system the parameters for the generation of each line scan are precalculated and stored in the system memory. The parameters for apodization are likewise precalculated and stored. Prior to the generation of each line scan, the type of line scan and the specific parameters for that scan are selected. The present invention is directed to an apodization attenuation circuit for using the selected parameters to enable a subset of elements in an array 16 of N transducer elements to transmit an apodized focused beam of coherent ultrasound, thus generating a focused wavefront. The focusing parameters for each transducer element include the clock phase of the transmission, the burst delay time to output a transmission and the burst length or number of pulses to be outputted in a transmission. Lateral focusing is achieved by introducing precise digitally controlled time delays in the transmission of pulses from each transducer element. A coarse control is provided by the burst delay and a fine control is provided by the clock phase.

Figure 1:
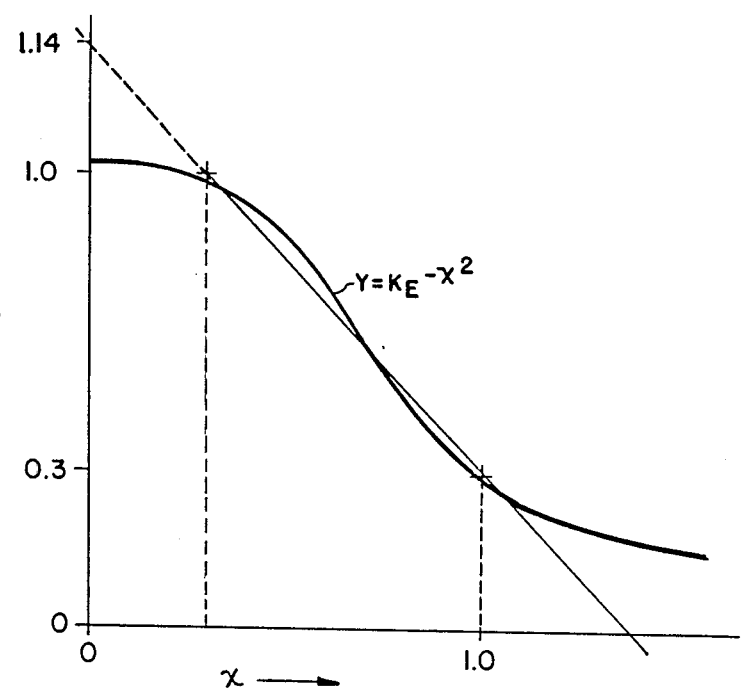
FIG. 1 illustrates a two-segment straight line approximation to a Gaussian function.

Apodization generally refers to a technique for reducing the sidelobe levels of a transducer array by modifying the amplitude of ultrasonic pulses transmitted from the array, that is, by shaping the distribution of energy applied across the transducer to a desired aperture function. The modification of the amplitude transmittance of the aperture of an ultrasound system reduces or suppresses the energy levels adjacent to the main lobe. As stated earlier, a 30% Gaussian apodization of an ultrasound wavefront transmitted from a linear or phased array appears to be optimal. The present invention utilizes the fact that a selected percent Gaussian apodization of a transducer array as viewed in a cross-section of an ultrasound pulse, can be closely approximated, within ±2 dB, by a horizontal straight line near the apex of the main lobe and two equal sloping lines passing approximately through selected end points of the aperture, as shown in FIG. 1. In the embodiment illustrated in FIG. 1, the y-axis represents the reference voltage and the x-axis represents the transducer elements. The y-axis is marked to indicate the full reference voltage as 1.0, and 30% of the reference voltage as 0.3. For each combination of transducer geometry and aperture function, it is necessary to approximate the points at which both a horizontal line through 1.0 on the y-axis and a horizontal line through 0.3 on the y-axis would intercept the normal curve of the main lobe such that the straight line from the x-y intercept at the peak of the lobe to an x-y intercept at 30% of the reference voltage would give a straight line approximation to the curve of the lobe. An optimal approximation with minimal error is shown in FIG. 1. The diagonal line is projected to intercept the x and y axes, so that the center line or the y-axis is intercepted above 1.0 and the x-line is intercepted beyond 1.0, where 1.0 represents the end of an aperture.

It should be clearly understood, however, that other Gaussian apodization choices and power levels may be selected and utilized with the present invention.

Figure 3:
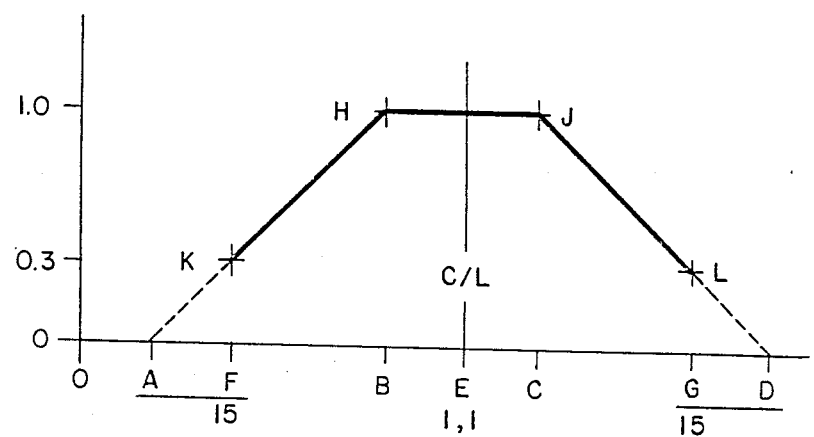
FIG. 3 is a plot showing the profile of potential along a resistor string.

FIG. 3, by way of example, shows the profile of potential across a selected aperture of a transducer array, which would serve as the reference input to a high voltage regulator that feeds the individual drivers of a linear array so that the output pulse magnitude would then approximate a desired 30% Gaussian apodization in the same way as the straight lines shown in FIG. 1. The aperture of elements which is active runs from point F to point G along the x-axis of FIG. 3. These are the points from which a projection from the x-axis intercepts a point at approximately 30% of the reference voltage on each sloping straight line at points K, L. Projections from the points B and C on the x-axis intercept the full reference voltage at points H and J. To achieve the profile of potential, for a given aperture, the interception of points H and J with the reference voltage indicates that the elements from point B to point C should be fed 100% of the reference volta $V_R$, while the elements at points F and G should be fed 30% of the reference voltage $V_R$. The elements between points F and B and between G and C should receive increasing percentages of the reference voltage from 30% to 100%. Points A and D represent elements of the transducer array receiving zero % of reference potential. Points A through F and D through G represent transducer elements receiving from 0% to <30% of reference potential. However, since these elements are outside the aperture from F to G, they do not transmit.

Figure 4:
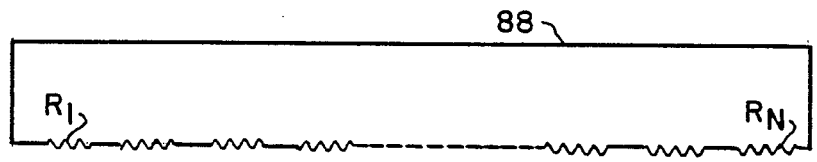
FIG. 4 is an abbreviated schematic of an endless resistor loop as used in the present invention.
Figure 5:
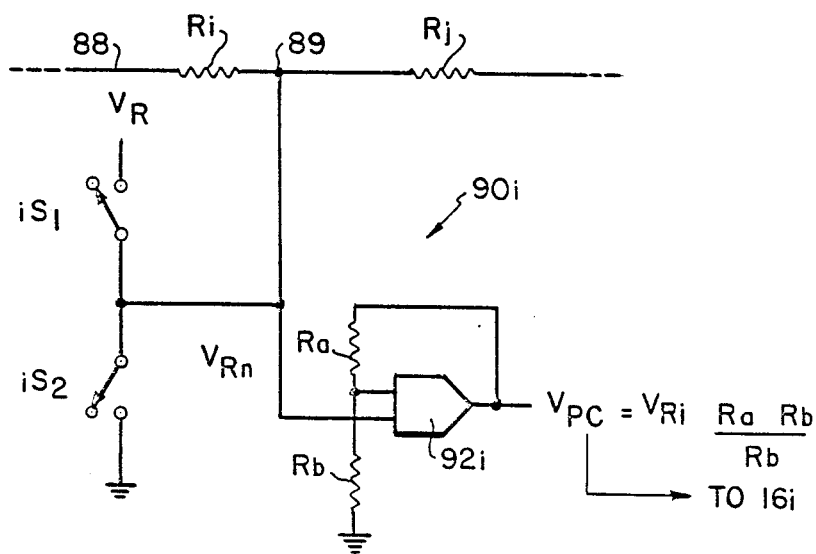
FIG. 5 is a circuit showing one of N apodization attenuation circuits.

Referring now to FIGS. 4 and 5, to achieve the desired profile of potential across a transmitting aperture, the circuit of he invention uses a resistor string 88 having one resistor Ri for each transducer element 16i in the linear array. These resistors R1, ..., Rn, are positioned between the transducer element drivers and are all connected in series. In addition, the last resistor Rn in the string is connected in turn to the first resistor R1 in the string, thus forming a closed loop.

FIG. 4 is a partial schematic of the resistor interconnection used in the present invention. For a transducer array 16 having N transducer elements, there will be N resistors in the string.

FIG. 5 is a circuit diagram of one of N apodization attenuation circuits 90 for one of N transducer elements. Each transducer element 16i in the linear array 16 is assigned a node 89 on resistor string 88 between two resistors 16i, 16j. The string 88 of resistors R1 ... Rn are all connected in series and each node 89i of this interconnection functions as a reference input for a high voltage regulator 92i associated with a particular acoustic element 16i. As shown in FIG. 5, two switches iS1 and iS2 are connected to each resistor node 89i. Thus for N resistors in the loop, there will be 2N switches in total, N switches S1 and N switches S2. These switches are connected such that S1 may be opened or closed to the reference voltage $V_R$ and S2 may be opened or closed to common.

To apply a profile of potential to a subset P elements of a transducer array such that $1 \leq P \leq N$, to obtain the profile of potential shown in FIG. 3 and using the resistor string 88 of FIGS. 4, 5, a switch S2 in the attenuation circuit 90 connected to the transducer element represented by point A is closed to common; a switch S1 in the attenuation circuit connected to the transducer element represented by point B is closed to the reference potential $V_R$, a switch S1 in the attenuation circuit connected to the transducer element represented by point C is closed to the reference potential $V_R$, and a switch S2 in the attenuation circuit connected to the transducer element represented by point D is closed to common.

Thus, by setting four switches out of 2N switches in four of N attenuation circuits 90 of FIG. 5, using precalculated values for determining the state of switches S1 and S2 for each of N attenuation circuits for each of N transducer elements in array 16, the profile of FIG. 3 is generated.

As the number of transducer elements in the aperture changes, the slope of lines shown in FIGS. 1 and 3 will change. Hence the points A, F, B, C, G and D will represent different elements in transducer array 16 for each different size aperture. As mentioned earlier, the directivity function of a transducer must be calculated or measured for each combination of a transducer geometry and aperture function. With such a calculation, one can determine precisely which elements within an aperture receive full potential, a selected percentage of potential for the end elements and intermediate percentages for elements between the end elements and the central elements. The profile of potential and the setting of switches S1, S2 must be calculated for each scan line. Any conventional method for the calculation, storage and setting of these apodization parameters may be utilized with the attenuation circuit of the present invention. In the preferred embodiment it is advantageous to use the transmit focus circuit disclosed in the cross-referenced application, thus utilizing a digital circuit which controls focusing in the transmit stage to control apodization of the transmit stage also. The use of that circuit for focusing is disclosed in the cross-referenced application. Its use for apodization is described herein.

Figure 6A:
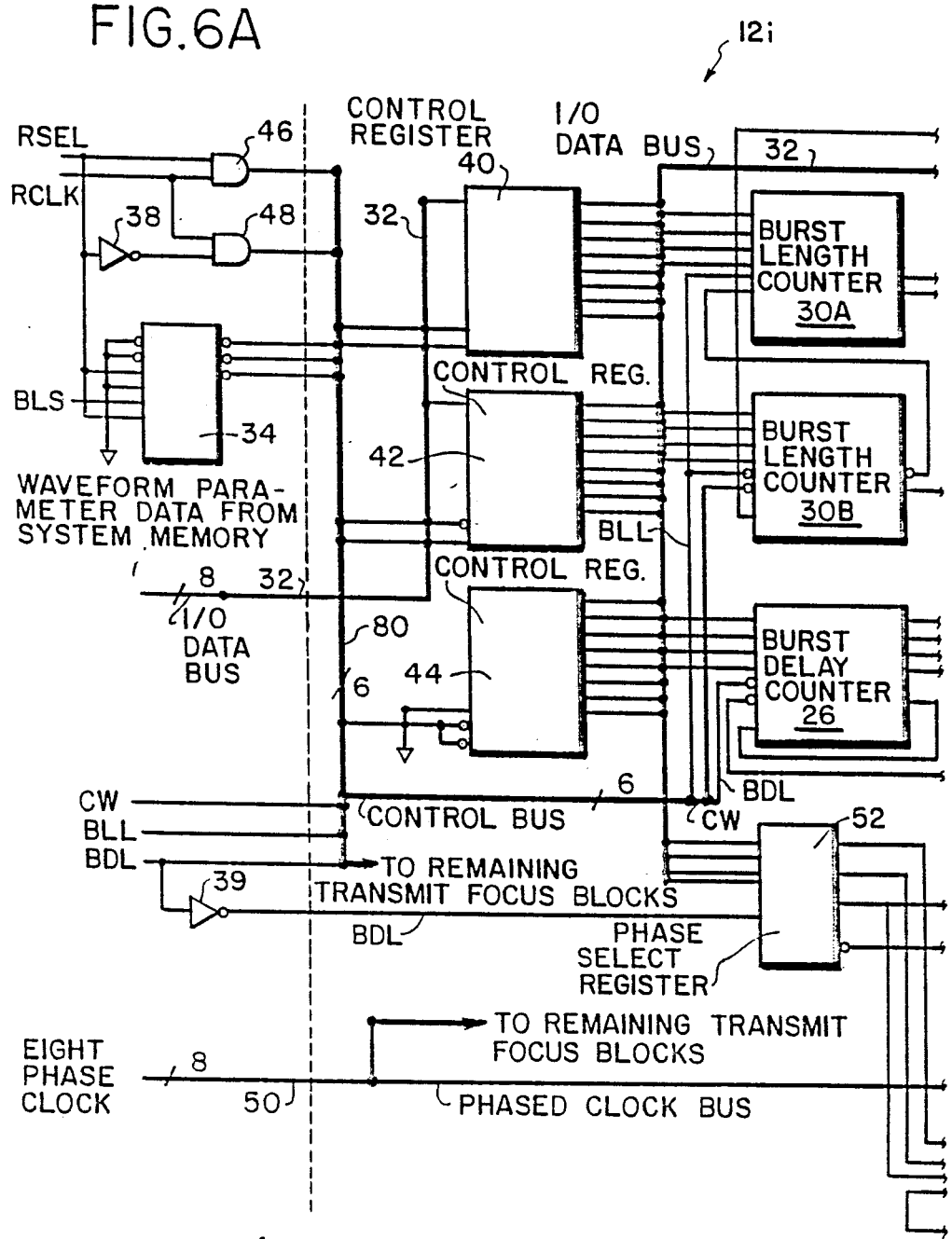
FIGS. 6A and 6B show a detailed circuit diagram of a transmit focus block which may be used with the present invention.
Figure 6B:
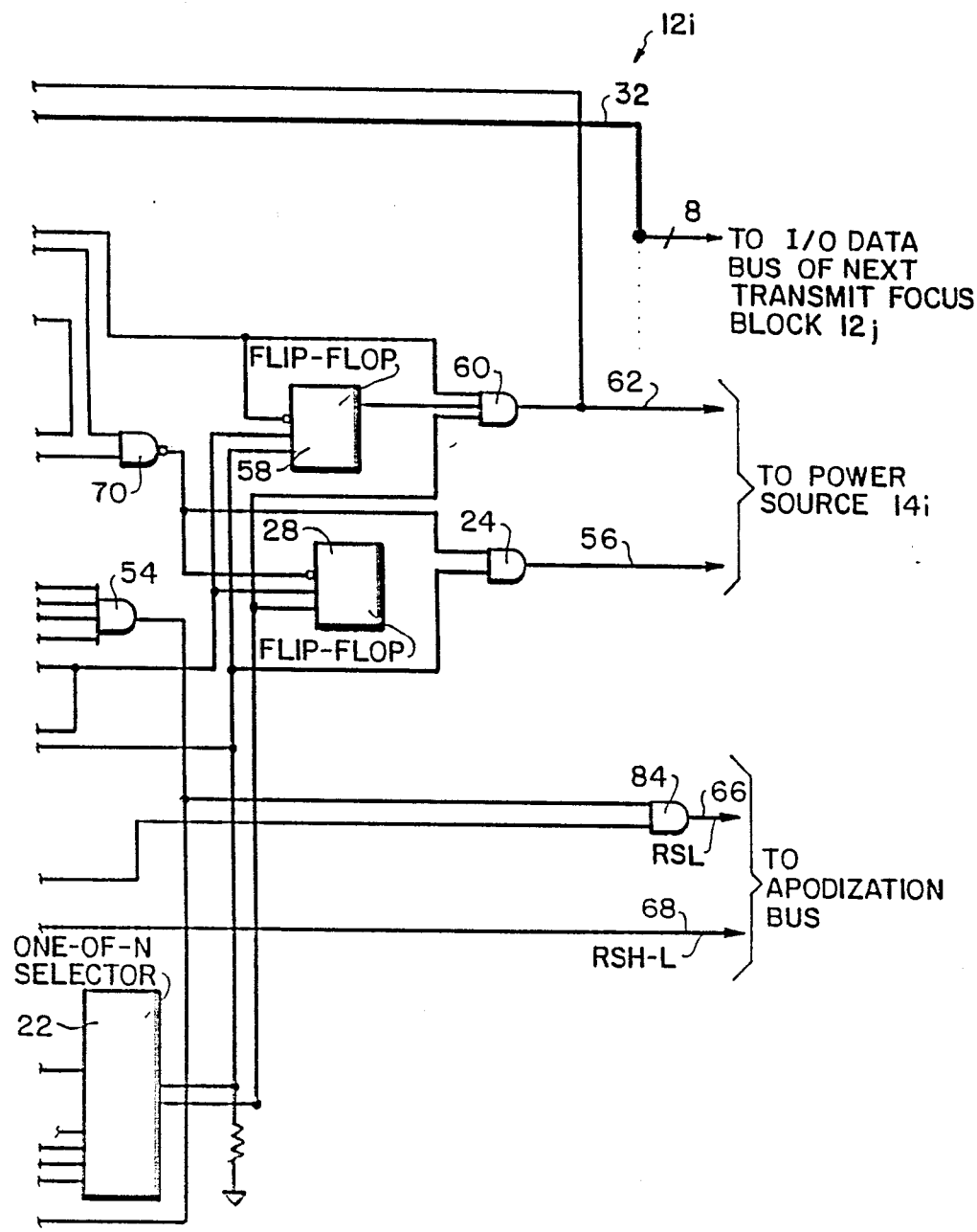

FIGS. 6A, 6B, together show the circuit diagram of the preferred embodiment of a transmit focus block 12i, as disclosed in the cross-referenced application. The left half of the circuit is in FIG. 6A and the right half is in FIG. 6B. For an array of N transducer elements, there are N transmit focus blocks 12. The prime function of the transmit focus block 12i is to select for transducer element 16i a particular phase of a multiphase clock, delay that clock phase for a given number of clock cycles and then output the same clock phase for a selected number of cycles. A secondary function is to control the amplitude of the pulses transmitted from each transducer element. The waveform and apodization parameter data are loaded into control registers 40, 42 in the transmit focus block 12i from the system memory via the array control electronics 21 (FIG. 2) prior to the transmission of each scan line.

Referring again to FIG. 6A, there are three control registers in a transmit focus block 12i, two shift registers 40 and 42 and one read-only register 44. The loading and shifting of the apodization parameters and the waveform parameters, clock phase, burst delay and burst length, is by digital input to control registers 40, 42 of the transmit focus block 12, the input arriving on a serial data bus 32 from the system memory. (A serial data bus has been chosen for design purposes unrelated to the invention.) The inputs of the two control shift registers 40, 42 are connected in parallel to an m-bit wide serial data bus 32. The only input to control register 44 which is a ROM is a control input from register selector 34. The outputs of all three registers 40, 42, 44 are three-state and connected in parallel to serial data bus 32. The data outputs of transmit focus block 12i are connected to the inputs of the next following transmit focus block 12j via data bus 32 for the serial shifting of data from the first transmit focus block 12a to the last one 12n. The data outputs of the last transmit focus block 12n in the chain are not connected. By this means, two sets of control shift registers 40, 42 (register 44 is a ROM) are provided across the full length of the string of N transmit focus blocks 12. A register selector 34 is provided to enable the system wide selection of any set of control registers 40, 42, 44 in the transmit focus blocks 12 of the system to be active on serial data bus 32. By selection of a particular control register set systemwide, data can be loaded and shifted serially (or simply read in the case of control register 44) in one control register string independently of the other control register string.

The data to be inputted to the set of control registers 40 and 42 are the waveform and apodization parameters for a preprogrammed focused wavefront for each ultrasound scan line. Control register 40 receives the burst delay count in bits 0 to 3 and the clock phase select in bits 4 to 6. Bit 7 of control register 40 is a programmed control bit which is used to set switches S1 in apodization attenuator 90, as will be discussed later. The burst delay is limited to a maximum of fourteen cycles in the preferred embodiment. For transducer elements outside the aperture for a particular scan line, and hence non-transmitting, the burst delay field contains a state 1111 (15) which inhibits the output from those elements, and the most significant bit (MSB) position of the clock phase is also used for an apodization bit, as explained hereinafter. Control register 42 receives the burst length or output pulse count data. Control register 44 is a read-only register in which two bit positions are used to prestore the frequently used output pulse count of two. The remaining bit positions in control register 44 are used for purposes not related to the invention.

Appropriate circuitry 38, 46 and 48 and a control bus 80 are provided for clocking and writing of data to the two control shift registers 40, 42. The signals RSEL (register select) and RCLK (register clock) select and clock the input of parameter data to the set of control registers 40, through inverter 38, gate 48, register selector 34 and serial data bus 32. The signal BLS (burst length select) selects the set of control registers 44, which are ROMs, through register selector 34 to be active system wide if the burst length is to be two. Otherwise, the signals RSEL, RCLK and BLS select and clock parameter data from serial data bus 32 into the set of control registers 42 through gate 46 and register selector 34. The actual loading of data into counters 26, 30A, 30B is commenced by the signals BLL (burst length load) and BDL (burst delay load) on control bus 80. The signal BDL is inverted in inverter 39 and also sent to the phase select register 52 discussed later. The serial data bus 32 of the first transmit focus block 12a in the chain is sourced from the array control electronics 21 of the ultrasound imaging system, FIG. 2.

In the preferred embodiment, the multiphase clock is an eight-phase clock, whose signals 20 are inputted on the phased clock bus 50 to all transmit focus blocks 12 in parallel. In each transmit focus block 12i, a single clock phase is selected by a one-of-eight selector 22, under the control of phase select register 52, which is in turn loaded with bits 4, 5 and 6 of control register 40, three bits selecting one phase of the eight clock phases. The selected phase is one input to output gate 24 which controls the outputting of the selected phase after a selected burst delay. A burst delay counter 26 is loaded by the lower order nibble of control register 40, that is bits 0–3. These four bits allow for a maximum delay of fifteen clock cycles of the selected clock phase before the output gate 24, under control of flip-flop 28, is opened to allow the outputting of a burst of pulses. In the preferred embodiment, a maximum delay of only fourteen cycles is used. The state of 1111 (15) is a special case decoded by a gate 54, connected to the output disable pin of phase selector 22. This state is used to inhibit the output of any signal by that particular transmit focus block 12i. Hence, it indicates that the associated transducer element 16i is non-transmitting and outside the aperture for a particular scan. This state is also used to set switches S2 in apodization attenuation circuit 90 in conjunction with a bit in the most significant bit (MSB) position of the clock phase. The inverted BDL signal to the phase select register 52 controls the burst delay for the selected phase. The selection of the burst length, that is, number of pulses to be outputted, is made from a second register, either register 42 or register 44, and loaded into a burst length counters 30A, 30B such that the same number of pulses are outputted from all the active transducer elements in a given aperture during a given transmission. (This is not a restriction but merely chosen for the particular embodiment.) The burst delay counter 26 is counted down by the selected clock phase until the preloaded number of delay cycles have occurred. At that time the second condition of output gate 24 is satisfied. When both conditions of gate 24 are satisfied, the state of flip-flop 28 is changed and output gate 24 is opened. The clock pulses of the selected phase are outputted on the line 56 to a transducer element driver 14i (FIG. 2) for the particular transducer element 16i in the array 16 to which the transmit focus block 12i is assigned.

The embodiment of the transmit focus block circuit shown in FIGS. 6A, 6B assumes that the transducer element driver 14i is a push-pull driver. Accordingly, not only are the clock pulses are outputted through gate 24, they are also outputted through gate 60. Thus, at the same time, by means of flip-flop 58 and gate 60 a one-half cycle delayed pulse is outputted on line 62 to the same transducer element driver. Counters 30A, 30B are loaded with the pulse train or burst length data stored either in control register 42 or 44, the read-only register. The number stored in control register 44 is a fixed "2". This number is given a special register since it is used most commonly and it is often desired to alternate a two pulse train with whatever pulse train length is stored in register 42. The pulses outputted by a transmit focus block 12i through output gates 24, 60 on lines 56, 62 are tallied by 8-bit counters 30A, 30B, which are connected in series. When counters 30A, 30B count out, gate 70 signals this condition, flip-flops 28, 58 are sequentially toggled and output gates 24, 60 are closed to further pulses, although pulses may still be present on the selected clock phase line.

A control signal CW (continuous wave) disables the burst length counters 30A, 30B, thus allowing a continuous pulse train to be outputted.

As previously noted, the state of "1111" loaded into delay counter 26 is specially decoded and is used to inhibit any clock output from a transmit focus block 12i if so selected. This state is also used in conjunction with the remaining bit of register 40, bit 7, and the MSB of the clock phase to set the status of output lines 66 and 68 which go to the apodization circuitry. As mentioned previously, along the entire loop of the resistor string connecting the apodization attenuators 90, to obtain the desired profile of potential two switches S1 will be closed to the plus $V_R$ potential and both of these switches S1 feed this potential to drivers of transducer elements within the aperture. Likewise, two switches S2 will be closed to common; both of these are outside the aperture for a scan and feed zero voltage to drivers of transducer elements outside the aperture. The apodization outputs required on lines 66, RSL, (resistor string low), and 68 RSH-L, (resistor string high), can be set by bit 7 of control register 40, the state 1111 of burst delay from control register 40 and the most significant bit (MSB) of the clock phase. The logic of these outputs for each transducer focus block 12$i$ and attenuation circuit 90$i$ is shown in Table 1 below.

TABLE 1

| If Burst Delay | ≠ 15 | X | = 15 |
|---|---|---|---|
| and Clock Phase MSB | X | X | 1 |
| and Apodization Bit 7 | 0 | 1 | 0 |
| Then S1 | Off | On | Off |
| and S2 | Off | Off | On |

Referring now to FIGS. 6A, 6B, and 5, for apodization attenuation circuit 90$i$, switch S1 will be on if bit 7 in control register 40 is a one (1). This bit is loaded into phase select register 52 (along with the phase select bits 4 through 6 of register 40). If this bit is a one, the state of S1 on is outputted on line 68, RSH-L. If this bit is a zero (0), there is no output from phase select register 52 on line 68, but there might be an output on line 66, RSL. Along the entire string of transmit focus blocks, two control registers 40 will have bit 7 as a one (1) for purposes of apodization. RSH-L thus carries the signal to close switch S1 to $V_R$, for two transducer drivers.

For switch S2, the logic is more complex. Switch S2 is closed to common only for an element outside the transmitting aperture. State 1111 of burst delay from control register 40 indicates this condition through gate 54 to the output disable pin of one-of-N selector 22. This condition is one input to gate 84 which controls the line 66, RSL. If the apodization bit, bit 7 of control register 40 is zero, it appears as such in phase select register 52. If the burst delay signal is not 1111 (15), then the second condition of gate 84 is not met and switch S2 is open. If the burst delay signal is 1111, (gate 54 is true), and if the most significant bit (MSB) of the phase delay, also from control register 40 and from one-of-N selector 22, is one (1), then the second input to gate 84 is satisfied and a signal is outputted on RSL to close switch S2 to common for that transducer element attenuation circuit. Two of 2N switches in the string will be closed to common along the resistor string.

When it is desired to begin the generation of an apodized, structured wavefront using an array of transducers, the process begins by the selection of the set of control registers to be loaded with the waveform and apodization parameter data from the system memory previously calculated to create the wavefront. This selection is made system-wide by register selector 34. In the preferred embodiment, the data is loaded serially and shifted into control registers, 40, 42 of each of the transmit focus blocks 12. The eight-phase system clock 20 is then started. At this time all of the output gates 24, 60, are closed, all phases, delays, desired number of output pulses, and the apodization bits have been loaded into control registers 40, 42, 44 by register select 34. With the starting of the clock, clock phases are selected for all transducer focus blocks 12 and the delay counters 26 begin to be counted down from the selected number. As delay counter 26 of each transducer focus block 12$i$ reaches zero, the bistable latches 28, 58 controlling the gates 24, 60 are set and the output gates 24, 60 are opened to allow outputting of a particular clock phase chosen for that particular transducer element. At the same time the status of outputs on lines 66, 68 is determined and signals for switches S1, S2 are outputted. With the outputting of the clocked pulses, the output counters 30A, 30B begin to tally the pulses. When the number of pulses outputted reaches the preselected number from register 42 or 44, the bistable latches 28, 58 are reset and the output gates 24, 60 are closed. The transmitting process for that particular transducer element for that particular wavefront is concluded.

The invention has been described and illustrated in terms of a linear array transducer. It should be clearly understood that the principles of the present invention are equally applicable to phased arrays, annular arrays and other types of transducer arrays that are available within the art.

In the particular embodiment, using a linear array having 128 transducer elements, the phase and delay selection is set by seven bits (stored in an eight bit register, the spare bit being used to create apodization). The selection of the burst length or number of pulses to be outputted is made by a second eight bit register such that the same number of pulses are outputted from all elements during a given transmission, (although this is not a restriction but merely a choice for the described and illustrated embodiment). The selection of four of switches S1, S2 out of 256 switches in 128 apodization attenuation circuits to control the potential applied to four transducer elements is determined by the emission directivity function which is calculated for each combination of transducer geometry and aperture function. Once these calculations are made, the straight line approximation to a desired percentage Gaussian apodization is calculated and the parameter values can be loaded and stored. The size of the aperture may be changed without affecting the electrical and/or logical circuits.

The invention is not limited to the number of switches and resistors, nor to any specific profile of potential.

The basic concept implemented in the present invention is that of locating in a set of registers at each transducer element the ability to select and delay the desired phase of a reference clock and to achieve a selected percentage Gaussian apodization using a linear model for approximation to the Gaussian profile. This allows the creation of any desired wavefront which is apodized at the transmit stage, be it at an angle or straight ahead, elliptical or spherical or parabolic, or literally any wavefront that is desired. The implementation of the chosen wavefront is in the programming and coding of the phase and delay in selected registers. A phased array sweep can be transmitted just as readily as a straight ahead beam.

I claim:

1. An apodization attenuation circuit to control the amplitude of pulses transmitted from each ultrasound transducer element in an array of N transducer elements comprising:

an aperture of m transmitting elements within said array wherein $1 \leq m \leq N$ with an acoustic axis passing through the center of said aperture;

means to focus the transmission of ultrasound energy from said elements within said aperture; and means to shape the distribution of electrical energy applied across said m transmitting transducer elements such that the excitation energy decreases as a function of distance from the center and the variation of peak pressure among said transmitting elements if a function of lateral distance of each element to the axis of the transmitted beam of ultrasound energy which means include:

a two wire power supply;

means to determine which of said transducer elements are within said aperture;

a string of N resistors, one for each of said transducer elements, said N resistors being connected in series with the last resistor in said string being connected to the first to form a closed loop;

N driver circuits, each driver circuit being connected to energize a corresponding transducer element as a function of a reference potential input;

each interresistor node of said resistor string being connected to the driver circuit of a corresponding one of said transducer elements and functioning as the reference potential input for said driver circuit;

means to connect at least one node of said resistor string on each side of said acoustic axis within said aperture to a first potential of said power supply and at least one node of said resistor string on each side of said acoustic axis outside said aperture to a common potential of said power supply such that the reference potential input from said resistor string to each of said driver circuits approximates a selected Gaussian function.

2. An apodization attenuation circuit for an array of N ultrasound transducer elements having an aperture of m transmitting elements within said array wherein $1 \leq m \leq N$ such that the peak pressure of an ultrasound beam transmitted by said elements varies as a function of lateral distance of each element to the axis of said transmitted beam, which is a centerline within said aperture, comprising:

means to shape the distribution of electrical excitation energy across said transducer elements in said array so that the acoustic response of the active surface of any transducer element in said array decreases as a selected Gaussian function of the distance of said transducer element from said centerline of said aperture, and said response at the outer elements of said aperture away from said centerline is a selected fraction of the response at said centerline, which means include a two wire power supply;

means to determine which of said transducer elements are within said aperture;

a string of N resistors, one for each of said transducer elements, said N resistors being connected in series, the last resistor in said string being connected to the first to form a closed loop;

N driver circuits, each driver circuit being connected to energize a corresponding transducer element as a function of a reference potential input;

each interresistor node of said resistor string being connected to the driver circuit of a corresponding one of said transducer elements and functioning as the reference potential input for said driver circuit;

means to connect said resistor string through at least one of said nodes on each side of said centerline and within said aperture to a first potential of said power supply, and through at least one of said nodes on each side of said centerline and outside said aperture to a common potential of said power supply such that the reference potential input to each of said driver circuits approximates said selected Gaussian function.

3. An apodization attenuation circuit for the transmit stage of a pulse echo imaging system to generate a profile of potential that is a selected percent Gaussian apodization to shape the distribution of energy across a transducer array of N transducer elements to a desired aperture function, wherein said attenuation circuit controls the electrical excitation of each transducer element within an aperture through its driver circuit, comprising:

a two wire power supply;

a string of N resistors, one for each of said transducer elements, said N resistors connected in series, the last resistor in said string being connected to the first;

each node of said resistor string being connected to a driver circuit of one of said transducer elements and functioning as reference potential input for said driver circuit associated with that transducer element;

two normally open switches positioned between each node and each of said driver circuits;

a first one of said switches being positioned between full reference potential and said driver circuit;

a second one of said switches being positioned between common and said driver circuit;

means to determine which of said transducer elements are within said aperture and therefore transmitting;

two of said first switches connected to driver circuits of transmitting transducer elements near the center of said aperture, one on each side of said centerline, being closed to full reference potential;

two of said second switches connected to driver circuits of non-transmitting transducer elements, one outside each end of said aperture, being closed to common;

whereby said profile of potential is achieved such that each driver circuit of each transducer element within said aperture receives through said resistor string a selected percent <100% to 100% of said reference potential as a function of the distance of said transducer element from said centerline of said aperture.

4. The apodization attenuation circuit of claim 3 wherein said array is a linear array.

5. The apodization attenuation circuit of claim 3 wherein said array is a phased array.

6. The apodization attenuation circuit of claim 3 further comprising:

a digital logic circuit to control the electrical excitation of said transducer elements;

register means in said digital circuit to store waveform and apodization parameters for each scan of said ultrasound transducer;

said stored apodization parameters including:

a state indicating for each transducer element whether or not it is within the transmitting aperture for a particular scan;

a state indicating for each transducer element whether one of said switches in its driver circuit should be closed to effect said profile of potential; and control means for selecting said apodization parameters for each scan of said ultrasound transducer.

7. An apodization attenuation circuit to control the amplitude of pulses from an ultrasound transducer comprising:

a power supply providing a source of electrical energy;

said transducer being an array of N transducer elements;

each of said transducer elements having a driver circuit to provide electrical excitation of said element;

a two wire connection from said power supply to said driver circuits of said transducer elements, one wire of which has positive potential and the other wire of which is common;

an endless loop of resistors connected in series, having one resistor for each of said transducer elements;

each node of said resistor loop connected to one of said transducer driver circuits and serving as a reference input to said driver circuit;

a pair of normally open switches connected to each node of said resistor loop;

a first switch of said pair connectable between said node and said wire having positive potential;

a second switch of said pair connectable between said node and said common wire;

such that for an array of N transducer elements, said resistor loop has N resistors, N first switches between said N nodes and said positive potential and N second switches between said N nodes and said common;

said profile of potential being realized by closing two of said N first switches in two different driver circuits to the positive potential, thereby connecting two nodes of said resistor loop controlling potential to two transducer elements, one on each side of the centerline of said aperture such that said elements receive full reference potential; and by closing two of said N second switches in two different driver circuits to common, thereby connecting two nodes of said resistor string controlling potential to two of said transducer elements such that no potential is fed to said elements, said elements receiving no potential being outside said aperture such that the reference potential distributed across said aperture via said resistor loop decreases as a function of the lateral distance of said elements from said centerline and so that transducer elements at the extreme edges of said array receive a precalculated percentage of said reference potential.

8. The apodization attenuation circuit of claim 7 further comprising:

a digital logic circuit to control the electrical excitation of said transducer elements;

register means in said digital circuit to store waveform and apodization parameters for each scan of said ultrasound transducer;

said stored apodization parameters including:

a state indicating for each transducer element whether or not it is within the transmitting aperture for a particular scan;

a state indicating for each transducer element whether one of said switches in its driver circuit should be closed to effect said profile of potential; and control means for selecting said apodization parameters for each scan of said ultrasound transducer.

9. In an ultrasound transmitting system of the type wherein ultrasound energy is transmitted by energizing transducer elements inside of a contiguous aperture of m elements within an array of N elements, $1<m<N$, and wherein the peak pressure generated by each of said m elements is controlled by associated reference potential inputs applied to driver circuits, improved means for generating said reference potential inputs which comprise:

a closed loop of m resistors connected in series with interresistor nodes therebetween, each of said nodes being connected to an associated one of said reference potential inputs;

means for connecting a first power supply potential to two of said nodes which are associated with elements inside of said aperture and means for connecting two of said nodes which are associated with two elements which are not inside of said aperture to a second power supply potential.

* * * * *